June 17, 1969   J. C. GIDDINGS   3,449,938
METHOD FOR SEPARATING AND DETECTING FLUID MATERIALS
Original Filed Dec. 27, 1965   Sheet 1 of 2
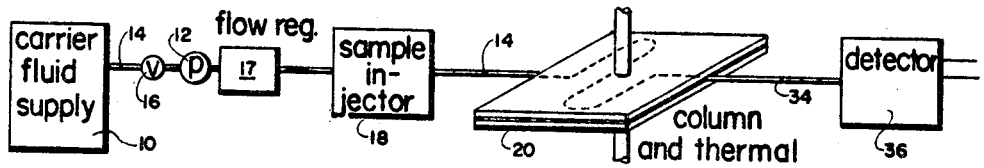
FIG. 1
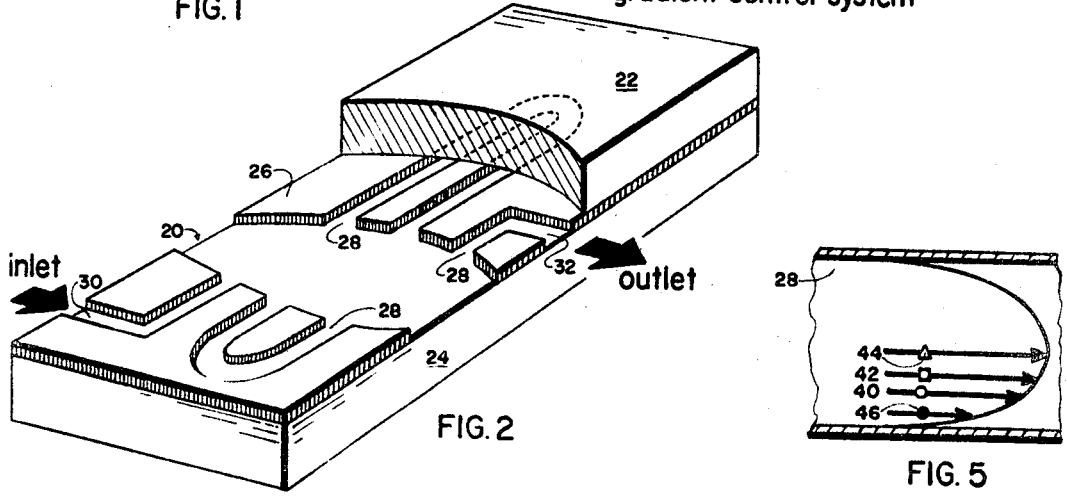
FIG. 2
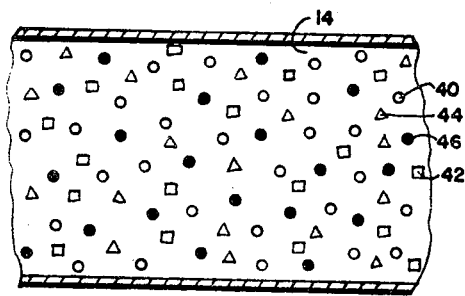
FIG. 3
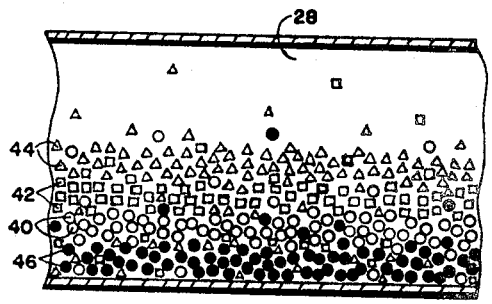
FIG. 4
FIG. 5
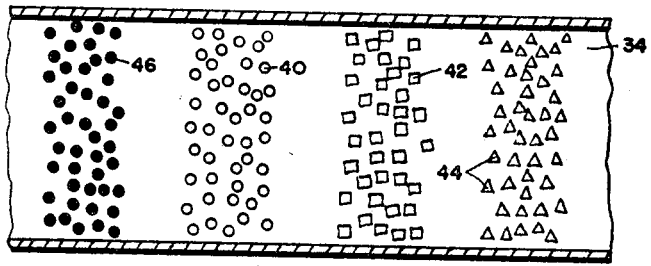
FIG. 6
Inventor
JOHN C. GIDDINGS
by Lynn O. Foster

United States Patent Office 3,449,938
Patented June 17, 1969

3,449,938
METHOD FOR SEPARATING AND DETECTING FLUID MATERIALS
John C. Giddings, Salt Lake City, Utah, assignor to The University of Utah
Continuation of application Ser. No. 516,572, Dec. 27, 1965. This application Aug. 3, 1967, Ser. No. 658,086
Int. Cl. G01n 31/00
U.S. Cl. 73—23      10 Claims

ABSTRACT OF THE DISCLOSURE

A separation method in which a differential migration of components is induced by transporting a sample through a column with a carrier fluid and imposing a segregating influence, such as a temperature gradient, upon the sample in an orientation perpendicular to the flow axis to (a) effect enrichment of the sample and (b) contribute toward a nonuniform flow velocity pattern the combination of which induces a separation of components for detection or collection thereof.

---

This application is a continuation of my copending application Ser. No. 516,571, filed Dec. 27, 1965, now abandoned.

The present invention relates to a method of separating co-mingled substances or materials one from another. More particularly, this invention relates to a method for rapidly separating intermixed substances in a fluid state by using a relatively powerful influence to generally induce spatial non-uniformity in the concentration of the substances (i.e. to generally concentrate the substances as strata or serially disposed layers) and by nonunifromly displacing the fluidized mixture longitudinal of its confinement so that the substances are displaced relative to each other to form serially disposed, longitudinally separate zones. Thereafter, detection and/or a collection of each zone is achieved by known techniques, as or after the zones are serially discharged from their confinement. This invention is especially adapted for rapid analytical separation of not only isotopes and small molecules, but also macromolecules and colloids, although this method is not limited to these specific applications.

Scientific history is replete with efforts to separate a fluid mixture into its components for analytical or other purposes. One example is chromatography wherein a sorbing material disposed within a separating column relatively retards the several components which later issue successively from the column. Two other examples are the "thermogravitational method" and the "pump membrane method."

Briefly, in the thermogravitational method, the mixture to be separated is placed in a vertically extending air tight tube, the tube normally having a diameter on the order of several inches. A resistance heater, longitudinally disposed along the center line of the tube, is used to heat the central space of the tube while the wall of the tube, about the complete circumference thereof, is cooled. In this way, countercurrent flow is induced, i.e. up at the center of the tube and down along the sides or wall of the tube, with the lighter substances being drawn off at the top of the tube and the heavier substances discharged at the bottom.

In the pump membrane method, a centrally extending permeable membrane accommodates countercurrent fluid flow in a tube which is respectively heated and cooled at opposite sides.

Each prior proposed separation method possesses one or more objectionable characteristics, among which are: inordinately long equilibration and separation times (often on the order of several days); limitation imposed by using gravity to induce flow; bulky apparatus (sometimes in excess of 100 feet in one dimension) which is difficult and expensive to fabricate and often awkward to use; and ineffective to optionally separate, in a satisfactory manner, multicomponent mixtures of either (a) relatively small molecules or (b) relatively large macromolecules.

In view of the foregoing, it would be a valuable contribution to the separation art, of the type mentioned, to provide a method of separation which is (a) rapidly completed with accurate results, (b) easy to practice, and (c) readily facilitates separation of substances comprising either small molecules or macromolecules.

Summarizing, in the presently preferred method of this invention, a basically unidirectional fluid flow is created along an elongated narrow passage which may be free of sorbent packing. The fluid flow may be either continuous throughout the separation of a sample of the mixture or periodic. Under some circumstances it may be desirable to stop the fluid flow or completely reverse the unidirectional flow. A suitable carrier fluid such as liquid or gas is used to appropriately unidirectionally displace a given mixture to be separated. Along the entire passage or at one or more regions of the passage, a temperature gradient, or other segregating influence, e.g. an electrical, magnetic, shear, gravitational or centrifugal force, is impressed upon the mixture. It is critical that the segregating influence be impressed essentially perpendicular to the unidirectional flow. The thermal gradient is initially impressed upon the mixture either (a) when the mixture is disposed in a stationary position, as may be typical for the separation of macromoecullar substances, or (b) when the mixture is continuously unidirectionally displaced in one direction or the other along the passage, as may be typical when separating substances comprising small molecules in the gas phase. Thus, when using a thermal gradient, thermal diffusion will cause each substance to tend to relatively migrate with respect to the other substances perpendicular to the flow axis. In a comparatively short span of time, the concentration of a given substance will be greater in one location than in other locations over the cross-section of the passage. This phenomenon is known in the art as "enrichment." The nonuniformity in the flow velocity pattern, induced as a result of surface friction at the passage wall, or by obstructions or packing designed to alter the velocity pattern, and, when using a thermal gradient, induced in part by the viscosity of the fluid, relatively displaces each substance with respect to the other substance along the flow path as the carrier fluid is unidirectionally displaced. Hence, those substances concentrating mainly in high velocity regions of the cross-section will travel more rapidly than those concentrating in lower velocity regions. In this way, longitudinal separation is rapidly achieved, the substances becoming serially disposed in zones along the passage as each substance tends to travel at a different velocity. The flow of the entire mixture may be reversed one or more times with a concomitant elimination of or change in the external influence, such as the thermal gradient. As stated earlier, the flow may be completely stopped for an interval of time, if desired, which is of particular value when separating macromolecule substances. For simplicity, the accumulation or concentration of each substance, more in one transverse location than in others, is designated "strata" formation, "stratifying" or the like throughout the entirety of this specification, even though complete separation is not achieved without fluid flow.

With the foregoing in mind, it is a primary object of this invention to provide a novel method for rapidly separating co-mingled substances or materials one from another.

Another important object of this invention is the provision of a novel separation method that requires an enormously reduced equilibration time which greatly enhances separation speed.

A further significant object of this invention is the provision of a unique separation method which is highly versatile accommodating separation of both small molecule-containing and macromolecule-containing substances.

These and other objects and features of the present invention will become more fully apparent from the following description and appended claims taken in conjunction with the accompanying drawings wherein:

FIGURE 1 is a schematic representation of the overall separation system, using a thermal gradient, according to the present invention;

FIGURE 2 is a perspective representation of one suitable separating column;

Figure 7:
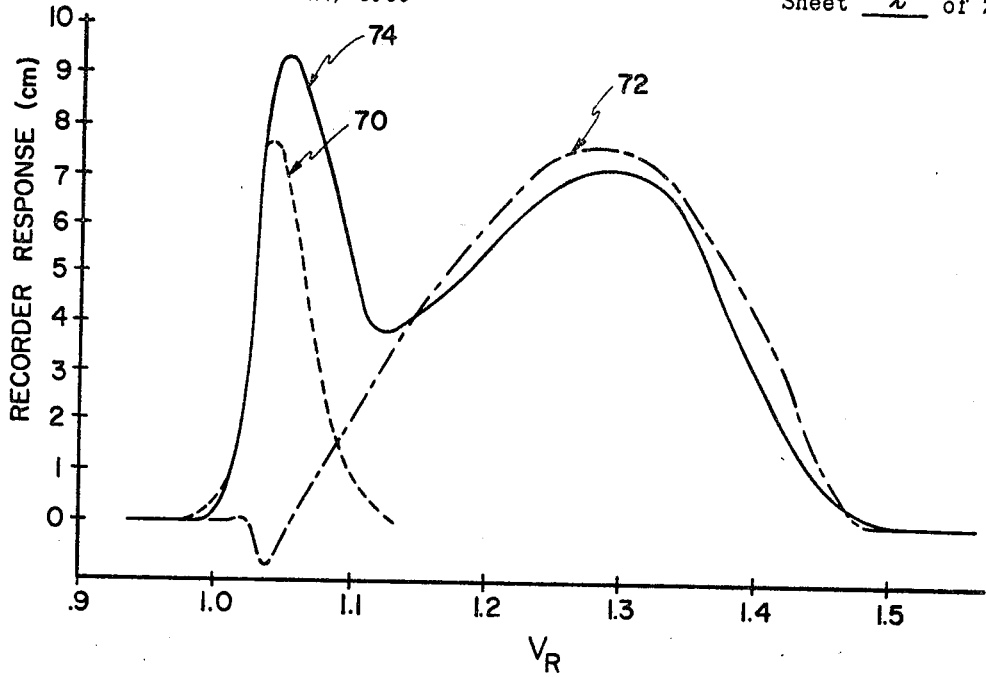
Figure 8:
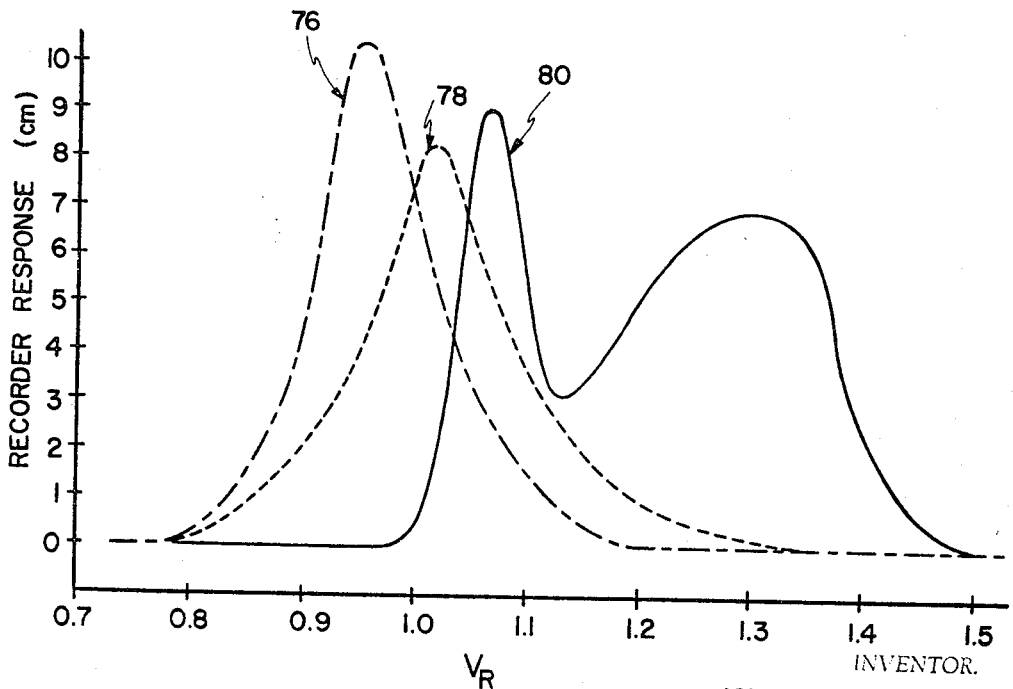

FIGURES 3–6, inclusive, are fragmentary schematic representations depicting the phenomena occurring responsive to successive performance of the manipulative step of the present method;

FIGURE 7 graphically illustrates in superposition the time-related component retention characteristics, achieved during experimentation using the present method, for (a) two single solute solutions (dashed lines), and (b) one mixture of the two solutes (solid line); and FIGURE 8 graphically illustrates (a) two mixtures, each having two solutes, carried through a separation column without subjection to a thermal gradient (dashed lines) and (b) one similar mixture of the two solutes subjected to a thermal gradient (solid line).

Specific reference is now made to the drawing wherein like numerals are used to designate like parts throughout and which schematically depict this invention. More particularly, FIGURE 1 diagrammatically illustrates a presently preferred overall system which functions to achieve separation, using either liquid or gas including vapors. Molecular redistribution results which resolves a complex mixture into its parts, disposed as longitudinally separate and distinct zones. This invention is applicable to rapid separation of both small molecules and macromolecules using a single phase separation technique, which does not require abosorbent or adsorbent packing as is required to separate using chromatography.

Structurally speaking, a reservoir 10 or other supply source of carrier fluid is used, usually the carrier fluid being an inert gas such as helium or nitrogen or a common liquid solvent such as water or benzene. A suitable pump 12 and a control valve 16 are disposed in the fluid line 14. The pump 12, with the valve 16 open, operates to unidirectionally displace carrier fluid from the reservoir 10, through a combined separating column-thermal gradient control system 20, in either direction. A satisfactory flow regulator 17 and a sample injector 18 are serially interposed between the pump and the column-gradient system 20 so as to be in the fluid communication with the segments of line 14.

A number of standard flow regulators may be used. One such flow regulator is the Dual Pressure Controller (Cat. No. 102190) manufactured by Beckman Instruments, Inc. of Fullerton, Calif., which consists of a 0 to 100 p.s.i. regulator and gauges, shutoff valves, restrictor needle valves, and other hardware.

The sample injector comprises a source of multi-component mixture, which is selectively introduced into the stream of carrier fluid using well-known conventional techniques.

Any suitable injector may be used. Injection of the sample or mixture into the column is normally accomplished using a system composed of a series of valves assembled in a way so as to pass a measured quantity of the mixture into the column. For some applications a standard injector, such as the Direct Column Injection Inlet (Cat. No. 102416) manufactured by Beckman Instruments, Inc. of Fullerton, Calif., may be used. This injector permits sample injection using a hypodermic syringe on the head of the column system through a self sealing, pressure resistant rubber septum.

One suitable combined separation column-thermal gradient control system 20 is schematically depicted in perspective in FIGURE 2. The system 20 of FIGURE 2 comprises upper and lower heat conductive plates 22 and 24 respectively, which are adapted by suitable heat exchange means (not shown) to be respectively retained at materially different temperatures. In this way, a substantial thermal gradient is created across the tortuous passage 28 of a gasket 26, the gasket being formed of a somewhat insular material, such as Teflon.

The elongated passage 28 may be of any desired cross-sectional and elongated configuration, a configuration which is generally rectangular in cross-section and generally sinusoidal in longitudinal configuration being illustrated in FIGURE 2. The passage 28 is adapted to receive the multi-component mixture, along with the transporting carrier fluid, at the passage inlet opening 30. Subsequently, the separated components of the mixture are successively discharged as effluent at the outlet opening 32.

The column effluent thereafter passes through line 34 to a suitable detector 36 of known commercially available type.

There are numerous detectors commercially available that may be used for a wide range of applications with the present separation system. For operations with gas and as thermal gradient, a thermal conductivity detector, such as the Four Filament Thermal Conductivity Detector (Cat. No. 102160), manufactured by Beckman Instruments, Inc. of Fullerton, Calif., may be used to sense changes in the heat conductivity of the various components of the mixture or sample. Another possible and frequently used detetctor is the flame ionization detector such as the Dual Hydrogen Flame Detector (Cat. No. 102250), manufactured by Beckman Instruments, Inc. of Fullerton, Calif., wherein the resistance of a hydrogen flame is altered by the various components of the carrier gas being burned, and subsequently ionized in the detector cell.

For fluids other than gases many commercial detectors are also available One such detecting system is based on a spectrophotometer such as a Perkin-Elmer Model 137 Spectrophotometer, which senses the absorption of infra-red radiation which is passed through the column effluent. Numerous amplifying and recording devices are available for recording the detector output signal. One such device comprises a Model 31 Vibrating Reed Electrometer, manufactured by Cary Instruments of Monrovia, Calif., which is capable of measuring currents as low as $10^{-17}$ amperes.

With extremely sensitive electrometers, a potentiometric recorder is used for converting the amplified detector signal into a visual pattern such as a strip chart. One of the many standard recorders available is the Model S601S SpeedServo recorder manufactured by Easterline Angus Instrument Co. of Indianapolis, Ind. This recorder has a high direct current sensitivity, fast response, and interference-free operation, making it very useful and reliable.

If desired, as an alternative to the utilization of a thermal gradient between the oppositely disposed plates 22 and 24 of the column-gradient system 20, any other suitable segregating influence may be used. Thus, segregation may be favorably influenced by turbulence, ultrasonic vibrations, mechanical vibrations and forces such as electrical, magnetic, gravitational and centrifugal, each of which is capable of increasing mass transfer rates. Other column configurations can also be used in certain cases.

With reference to all five figures of the drawing, the operation of the present system will now be described.

With the control valve 16 set to accommodate flow between the carrier fluid reservoir 10 and the column-gradient system 20, the pump 12 is energized to deliver carrier fluid at a rate and in quantities governed by the flow regulator 17. At any point in time the flow of carrier fluid and anything transported by the carrier fluid is unidirectional.

The carrier fluid flows past the sample injector 18 where a measured fluid sample of the multi-component mixture to be separated is injected or otherwise introduced into the stream of carrier fluid. Upon being injected, the measured sample of the multi-component mixture will generally be disposed as schematically depicted in FIGURE 3, i.e. as a generally homogeneous fluid. The carrier fluid is not illustrated in any of the FIGURES 3-6, inclusive. While sample injection is illustrated as taking place in line 14, "on column" injection may be used, if desired. The sample may be introduced into the carrier stream as a relatively narrow pulse, as a relatively long train with a generally sharp front, or in any other desired manner.

The sample-carrier combination now is displaced by controlled operation of the pump 12 into the passage 28 of the column-gradient system 20 where separation occurs.

As stated earlier, separation is achieved in a two-fold manner. First an externally generated segregating influence, such as the previously described thermal gradient, is impressed upon the carrier-transported mixture transverse to the flow axis. The influence spoken of can be any suitable force, field, gradient or the like of selectively controlled intensity to which the mixture is subjected over part or all of the volume of the column passage either when the mixture is being unidirectionally displaced in the column, or when a mixture is stationarily located within the column, or both.

The mentioned segregating influence creates a concentration of each substance of the mixture more in one lateral region or strata than in the other lateral regions, in a manner generally schematically illustrated in FIGURE 4. It is to be appreciated that the distribution of the substances normally is partially overlapping.

The illustrated distribution of FIGURE 4, which for simplicity illustrated only four substances, i.e., 40, 42, 44, and 46 is often rapidly achieved. When less rapidly achieved, flow can be interrupted for whatever period is needed to achieve this steady-state distribution.

When a termal gradient is used to achieve the orientation of FIGURE 4, one suitable magnitude of thermal gradation particularly useful for separating macromolecules, comprises subjecting one heat conductive plate 22 or 24 to a substantially uniform temperature on the order of about 50° C. and the other heat conductive plate 24 or 22 to a substantially uniform temperature on the order of about 20° C., although these temperatures are examples only and do not restrict the scope of this invention. In some cases temperature differences of several hundred centigrade degrees are preferred. Of course, when and if desired the gradient or influence may be reversed, eliminated or otherwise varied to enhance separation. Suitable means of known type can be utilized to selectively control and vary the intensity of the thermal gradient or other segregating influence and to control the degree or magnitude of the gradient. The direction of the gradient or influence or at least a major component thereof must be normal to the flow path of the fluid.

The second part of the two-fold manner of separation comprises unidirectionally displacing the mixture to induce a nonuniform velocity flow pattern. Thus, each stratified concentration of substance is longitudinally displaced in the column along the passage 28 at a different rate which results in zone separation of the several substances. The flow profile of FIGURE 5 is representative of the special case of parabolic laminar flow wherein the mean velocity of each concentration of a substance is proportional to the length of the four respective arrows illustrated. The lateral position of these arrows represents approximately the center of gravity of the strata for the respective substances 40, 42, 44, 46. The nonuniformity in the flow profile is due in part to viscous effects in accordance with well-known hydrodynamic phenomena, as illustrated by Poiseuille flow. It is also due in part to the effect of temperature gradients on viscosity. When the unidirectional displacement of the stratified substances, with periodic cessation or unidirectional reversal thereof as desired, has displaced the concentration of each substance one with respect to the next, as mentioned, the several substances will be serially arranged in longitudinal sequence along the passage 28. Normally the "zoned" substances will be more dense toward one surface of the passage, usually the colder surface, when a thermal gradient is used. Thus, each zoned substance follows the previous zoned substance and is so discharged at the effluent opening 32. Thus, the different components will appear at the detector 36 at different time intervals, as diagrammatically represented in FIGURE 6. Of course, each zone normally has a significantly greater longitudinal dimension than traverse dimension.

Naturally the nonuniform flow profile can be varied for example by utilization of different passage geometry, the use of adsorbent or inert packing and control of fluid composition and fluid velocity, including turbulence, although these techniques are not necessary but are only matters tf secondary consideration.

The present invention comprehends reversing the direction or flow through the combined separation column-gradient control system 20 one or more times. When a gradient is used, it may be either or both spatially and time graduated. One suitable column system which could be used to reverse the flow is disclosed in United States Patent 3,199,274. Of course, it is very important to note that packing is not necessary in accordance with the present invention.

Moreover, the flow of sample-carrier combination can be halted with the sample or mixture disposed within the passage 28 and thereafter flow may be unidirectionally continued in the same or in a reverse direction one or more times. It is also to be understood that conjoined with halting or reversing of flow, the gradient force, or field of segregating influence can be eliminated, reduced and/or reversed to aid in stratifying the mixture and increasing the separation of zones.

In some instances, particularly with macromolecules, flow can be halted temporarily just after the sample has entered passage 28 through inlet 30 to allow "equilibration" and stratification to take place under no-flow conditions. As another example of useful changes in flow and forces, an alternating flow can be established with the gradient force held at one level when flow in one direction and the gradient force eliminated when flow occurs in the opposite direction. In this way the sample goes through a repetitive separation cycle, the degree of separation being enhanced at each cycle.

As the longitudinally zoned substances issue from the effluent opening 32 of the passage 28, the separated components are collected and/or detected by the detector 36 using well-known techniques, as explained previously. Thus the chemical content, molecular weight distribution, or other desired information about the sample or mixture is obtained.

In view of the foregoing, it is readily apparent that the present invention comprises a rapidly effective separation method used to induce spatial nonuniformity in the concentration of substances comprising a multi-component mixture and to longitudinally divide the substances into zones using nonuniform unidirectional flow.

In contrast to the above-mentioned thermogravitational and membrane techniques, the present method, using only a unidirectional stream flow, is extremely simplified and can be used with, but is not limited to, small diameter columns resulting in an enormously reduced equilibration time and thus a greatly enhanced separation speed.

Another reason for the mentioned speed of the present method invention is that comparatively weak thermogravitational forces are no longer depended upon to cause flow. Instead such flow is always unidirectional, which allows use of a wide and extensive range of external fluid-displacement sources, including high pressure pumps. Moreover, unlike chromatography, the present invention does not rely upon special requirements relating to internal column geometry and sorbent packing in the column. This makes it possible to elute the components of the mixture in a rapid sequence as a series of zones while avoiding problems which have plagued the prior art, e.g. the difficulty and cost encountered in packing chromatographic columns with sorbent materials and the difficulty in finding sorbent materials which simultaneously have good selectivity, high capacity, rapid mass transfer, and controllable retention properties.

Thus, the method of this invention utilizes, in a unique way, the multiplying effect of flow nonuniformity on concentration biases introduced by a suitable force, field or gradient. At any point in time, the flow, though reversible, is unidirectional with a nonuniform velocity profile. This method makes it possible to use exceedingly long and narrow tubes, when desired, with all the attendant advantages of high separating power and speed.

As mentioned, no adsorbent packing is needed to achieve rapid separation and, thus it is broader in scope than chromatography. Specifically, chromatography is a two phase system wherein one part of the mixture (the stationary phase) is held stationary by some means as a second part of the mixture (the mobile phase) flows over the first stationary phase. With the present invention, the operation is one of single phase where no stationary phase is needed to relatively impede the displacement of the components of the mixture. The near infinite range of suitable fields, forces, and gradients make it possible to control the concentration bias or segregating influence. Very strong forces can be used to separate small molecules, a result which can be achieved using normal chromatographic methods, or exceedingly weak forces can be used to separate macromolecules in order to control the migration more delicately, a result not readily achievable with normal chromatographic methods.

Generally, FIGURE 7 is a graphical representation of the $V_R$ and the recorder response in centimeters of the time-related solute retention characteristics achieved by this invention on three distinct liquids. $V_R$ represents the ratio of the volume of carrier liquid passed through a thermal gradient to the effective column volume. $V_R$ is essentially proportional to time, and is used mathematically to compensate for variance in flow rates so that different samples may be suitably compared. $V_R$ is calculated from the formula $$V_R = \frac{V - V_D}{V_C}$$

where $V_R$ is the mentioned carrier volume ratio, $V$ is the volume of carrier delivered to the column, $V_D$ is the volume of the capillary leading from the end of the effective thermal gradient to the detector cell plus that of the capillary leading from the sample injector to the beginning of the effective thermal gradient (e.g. tube 34 and, part of tube 14 of FIGURE 1). $V_C$ is the column volume.

The ratio $V_R$ is indicative of the retention of sample components within the column. If the volume of carrier delivered were equal to $V_C + V_D$, thence $V_R$ would equal unity indicating no retention of the sample. $V_R$ greater than unity indicates a retention of sample in the column, the amount of sample retention being indicated by the relative magnitude of $V_R$. The ordinate of the graph is in centimeters of recorder response, which is proportional to the concentrations of the components.

In the specific example graphically represented in FIGURE 7, three independent samples were examined in one suitable thermal gradient column apparatus comprising two aluminum cylinders, each two inches in axial length, placed in longitudinally stacked relation. The top cylinder was solid and the lower cylinder essentially solid except for milled out passages to provide for the flow of water which controls the temperature of the lower cylinder. A length of coiled tubing was interposed between the cylinders and the resuting assembly is clamped together to prevent relative movement of the structural components during use. The tubing used in this exemplary apparatus was formed of Teflon, and had an inside diameter of 0.022 inch, and a length of 182 feet. The top cylinder was provided with a heating unit to generate uniform temperatures of selected magnitude.

The sample represented by the line 70 (FIGURE 7) was a liquid sample of a single polystyrene solute having a molecular weight of 3525. The sample represented by the numeral 72 was a liquid sample of another single polystyrene solute having a molecular weight of 411,000. The line 74 represents a sample of a mixture of the polystyrene solutes represented by lines 70 and 72. In this particular example, a temperature drop of 55° centigrade was imposed (75° centigrade at the hot surface and 20° centigrade at the cold surface). It is apparent from the graph of FIGURE 7 that sample 70 with the smaller molecular weight has the smaller retention time, and sample 72 with the larger molecular weight has the greater retention time. The difference in retention times of the components makes separation possible. Hence, the components of the mixture are separated according to relative molecular weights as indicated by line 74.

FIGURE 8 illustrates the effect of the temperature gradient on separation of solutes of a mixture passed through the mentioned two cylinder apparatus. The line 76 represents the recorder response to a two-solute polystyrene sample introduced into the column without imposition of a thermal gradient. That is, the temperature of one cylinder was the same as the temperature of the other cylinder, i.e. at about 75° centigrade. This uniform elevated temperature significantly reduced the retention time for the sample and the solutes thereof and there appeared to be little or no evidence of separation.

A mixture similar in composition to the immediately above described mixture was introduced into the column with the respective cylinders maintained at a relatively uniform, comparatively low temperature of 25° centigrade. This produced a recorder response identified as line 78 in FIGURE 8. There was a somewhat greater retention time of the sample. However, no apparent separation was evident.

The curve 80 represents the recorder response to the passage of a third and similar sample mixture through the described two cylinder apparatus. The third sample was subjected to a 55° centigrade, laterally disposed temperature gradient, i.e. the top cylinder was maintained at 75° centigrade and the bottom cylinder at 20° centigrade. As is visually evident, both of the solutes had increased retention times and the solute with the greater molecular weight had a retention time sufficiently greater than that solute having the smaller molecular weight. Thus, meaningful separation was achieved.

Wth the foregoing in mind, the combined effect of the laterally imposed temperature gradient and the generally unidirectional fluid flow uniquely provide for lateral differential migration of the components of the mixture. The discussed graphical information depicted in FIGURES 7 and 8 indicates the present invention provides desirable separation capabilities.

The invention may be embodied in other specific forms without departing from the spirit or essential characteristics thereof. The present embodiment is thereof to be considered in all respects as illustrative and not restrictive, the scope of the invention being indicated by the appended claims rather than by the foregoing description, and all changes which come within the meaning and range of

What is claimed and desired to be secured by United States Letters Patent is:

1. In a method of separating the components of a mixture of fluid substances achieved by practicing the following steps as desired: placing the mixture within a column of the chromatographic type having an influent and an effluent end, impressing a segregating influence in a direction generally normal to the axis of the column across the confined mixture of fluid substances for a substantial distance along the column to establish an influence-gradient between opposed column wall portions at any given point along the column under said influence, generally laterally segregating the components between the wall portions by relative migration of the respective components in response to the generally transverse influence-gradient, axially displacing the mixture along said column, the flow profile of the mixture comprising different average rates of displacement for the respective components to thereby concentrate each substance in a zone, the zones being serially disposed one after another along the column, and detecting the nature of the substance of each zone.

2. A method as defined in claim 1 wherein said impressing step comprises subjecting the mixture in the manner set forth to at least one of the following: a thermal gradient, an electric field, a centrifugal force, a shear field, a gravitational field.

3. A method as defined in claim 1 wherein said impressing and said displacing steps are performed concurrently and wherein said displacing step comprises moving the mixture with a carrier fluid.

4. A method as defined in claim 1 wherein said impressing and displacing steps are essentially sequentially initiated whereby a spatial nonuniformity of concentration of the substances of the mixture is achieved at least in part while the mixture is stationary.

5. A method as defined in claim 1 wherein said displacing step includes moving said substances of the fluid mixture through a sorptive material disposed within the confined space whereby each substance is retarded at a different rate to enhance zone separation of the substances.

6. A method as defined in claim 1 wherein segregating influence is developed by at least one of the following: turbulence, ultrasonic vibrations, mechanical vibrations, and such other forces capable of increasing mass transfer rates.

7. In a method of separating a combination of fluid materials into components comprising situating the combination of fluid materials within a sorbent-free elongated enclosure, imposing an enriching influence essentially perpendicular to the elongated enclosure thereby generally segregating the components one from another into transversely disposed strata, axially displacing the entire combination with a carrier fluid and simultaneously axially enriching the components being stratified one with respect to another by relative axial displacement of the materials within the elongated enclosure, serially discharging t displaced materials one after another from the elongat enclosure.

8. A method as defined in claim 7 wherein the d placing includes selectively controlling the average rate displacement of said entire combination, wherein t axial direction of displacement of said entire combinati is selectively reversed at least once, and wherein said ii posing step includes impressing a selectively controll external enriching influence of a controlled graduated i tensity upon the combination.

9. A method as defined in claim 7 wherein said e riching influence is eliminated for an interval of time ai then reinstituted, to enhance separation.

10. In a method of separating components of a samp of a multicomponent fluid, the components having vario densities
  injecting a volume of the multicomponent fluid into ɩ elongated enclosure that is free of sorbent packin
  impressing a thermal gradient across the enclosure a general direction normal to the axis of the e closure so that one wall portion of the enclosure elevated in temperature relative to a second oppos( wall portion of the enclosure,
  separating the components into transverse layers witi in the enclosure by causing the components to migra into laterally enriched strata, less dense componen normally migrating first toward the side of the the mal gradient having the greater temperature ar concurrently
  displacing a carrier fluid that is normally inert to tl mixture to axially drive the respective components ; various speeds through the column such that the con ponents are simultaneously axially and transverseI separated one from another into component zonɛ axially serially arrayed along the enclosure, and
  serially detecting the components of the sample.

References Cited

UNITED STATES PATENTS

| 2,920,478 | 1/1960 | Golay | 73—23. |
|---|---|---|---|
| 3,038,326 | 6/1962 | De Ford | 73—23. |
| 3,043,127 | 7/1962 | De Ford | 55—386 ɔ |
| 3,076,544 | 2/1963 | Bodine | 209— |
| 3,133,876 | 5/1964 | Klass | 209— |
| 3,250,057 | 5/1966 | Clarke | 73—23. |
| 2,723,033 | 11/1955 | Jones | 210—7 |
| 3,345,803 | 10/1967 | Smith | 55—5 |

FOREIGN PATENTS

| 314,171 | 9/1919 | Germany. |
|---|---|---|
| 480,213 | 7/1929 | Germany. |

FRANK W. LUTTER, *Primary Examiner.*

U.S. Cl. X.R.

55—67, 81; 210—72, 198